(12) United States Patent
Johnson et al.

(10) Patent No.: US 7,140,635 B2
(45) Date of Patent: Nov. 28, 2006

(54) PORTABLE LUGGAGE CARTS/CARRIERS

(75) Inventors: Chris Johnson, Santa Ana, CA (US); A. C. McMillan, Fairfield, CT (US)

(73) Assignee: Franzus Company LLC, Beacon Falls, CT (US)

( * ) Notice: Subject to any disclaimer, the term of this patent is extended or adjusted under 35 U.S.C. 154(b) by 198 days.

(21) Appl. No.: 10/847,938

(22) Filed: May 18, 2004

(65) Prior Publication Data

US 2005/0258621 A1    Nov. 24, 2005

(51) Int. Cl.
*B62B 1/12*    (2006.01)
(52) U.S. Cl. ............... 280/646; 280/38; 280/40; 280/645; 280/641; 280/47.17; 280/655; 280/47.27
(58) Field of Classification Search ............... 280/38, 280/40, 645, 646, 641, 47.17, 47.18, 47.24, 280/47.27, 47.29, 47.315, 651, 655, 655.1, 280/638–9, 47.131, 35
See application file for complete search history.

(56) References Cited

U.S. PATENT DOCUMENTS

| | | | |
|---|---|---|---|
| 3,043,603 A * | 7/1962 | Major, Sr. ............ 280/40 |
| 3,788,659 A | 1/1974 | Allen |
| 3,947,054 A | 3/1976 | Hall |
| 3,998,476 A | 12/1976 | Kazmark, Sr. |
| 4,121,855 A | 10/1978 | Mortenson |
| 4,315,632 A | 2/1982 | Taylor |
| 4,335,895 A * | 6/1982 | Walker ............ 280/47.131 |
| 4,448,434 A * | 5/1984 | Anderson ............ 280/40 |
| 4,506,897 A | 3/1985 | Libit |
| 4,577,877 A | 3/1986 | Kassai |
| 4,637,626 A | 1/1987 | Foss et al. |
| 4,659,096 A | 4/1987 | Leimgruber |
| 4,754,985 A * | 7/1988 | Im et al. ............ 280/40 |
| 4,917,392 A * | 4/1990 | Ambasz ............ 280/40 |
| 4,969,660 A * | 11/1990 | Spak ............ 280/646 |
| 4,989,889 A | 2/1991 | Server Perez |
| 4,993,727 A * | 2/1991 | vom Braucke et al. ....... 280/40 |
| 5,072,958 A | 12/1991 | Young |
| 5,127,662 A | 7/1992 | Spak |
| 5,263,727 A | 11/1993 | Libit et al. |
| 5,312,006 A * | 5/1994 | Lag ............ 211/195 |
| 5,348,325 A * | 9/1994 | Abrams ............ 280/40 |
| 5,468,005 A | 11/1995 | Yang |
| 5,630,601 A * | 5/1997 | vom Braucke et al. ....... 280/40 |

(Continued)

FOREIGN PATENT DOCUMENTS

GB    2082513 A  *  3/1982

*Primary Examiner*—Christopher P. Ellis
*Assistant Examiner*—Vaughn T. Coolman
(74) *Attorney, Agent, or Firm*—Melvin I. Stoltz

(57) ABSTRACT

By providing a frame assembly, two wheel holding carriers which are arcuately pivotably mounted to the frame assembly, and a support platform which is also pivotally mounted to the frame assembly and controls the movement of the wheel holding carrier, a small, compact, two wheeled, luggage cart/carrier is achieved which is capable of quickly and easily arcuately pivoting wheel support brackets between two alternate positions, with ease and convenience. In addition, the arcuate pivoting movement of the wheel supporting brackets is automatically achieved simultaneously with movement of the luggage support platform from a stowed position to a deployed, usable position. The support platform is pivotally mounted to the terminating end of the frame assembly for being arcuately pivoted between a first, stowed position and a second, deployed position wherein the support platform is substantially perpendicular to the plane established by the frame assembly.

16 Claims, 5 Drawing Sheets

U.S. PATENT DOCUMENTS 5,803,471 A * 9/1998 DeMars et al. ................ 280/40
5,984,327 A * 11/1999 Hsieh et al. .............. 280/47.24
6,053,514 A * 4/2000 Su ............................... 280/40
6,425,599 B1 * 7/2002 Tsai ............................ 280/652
RE38,436 E * 2/2004 Su ............................... 280/40

* cited by examiner

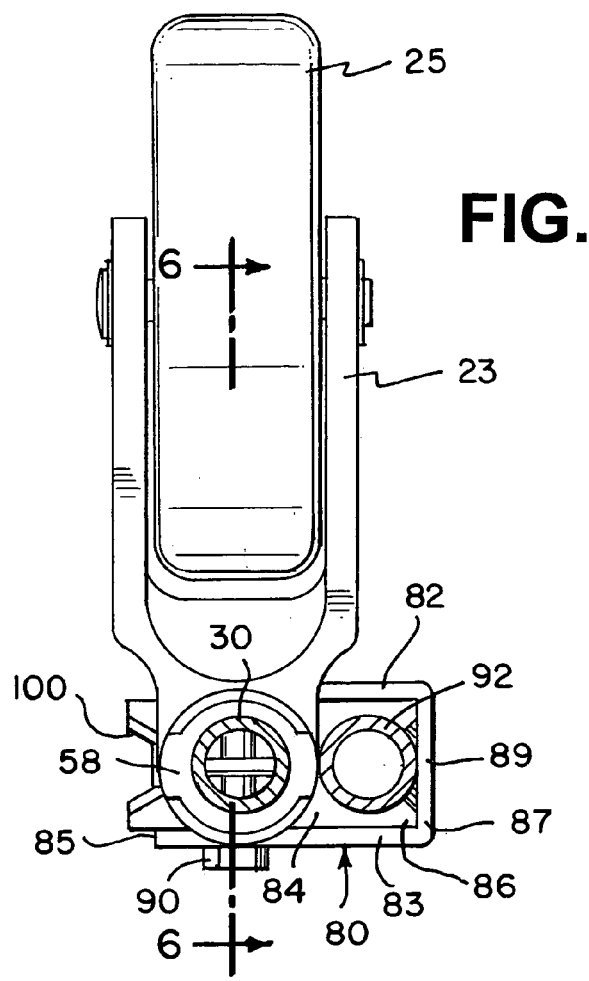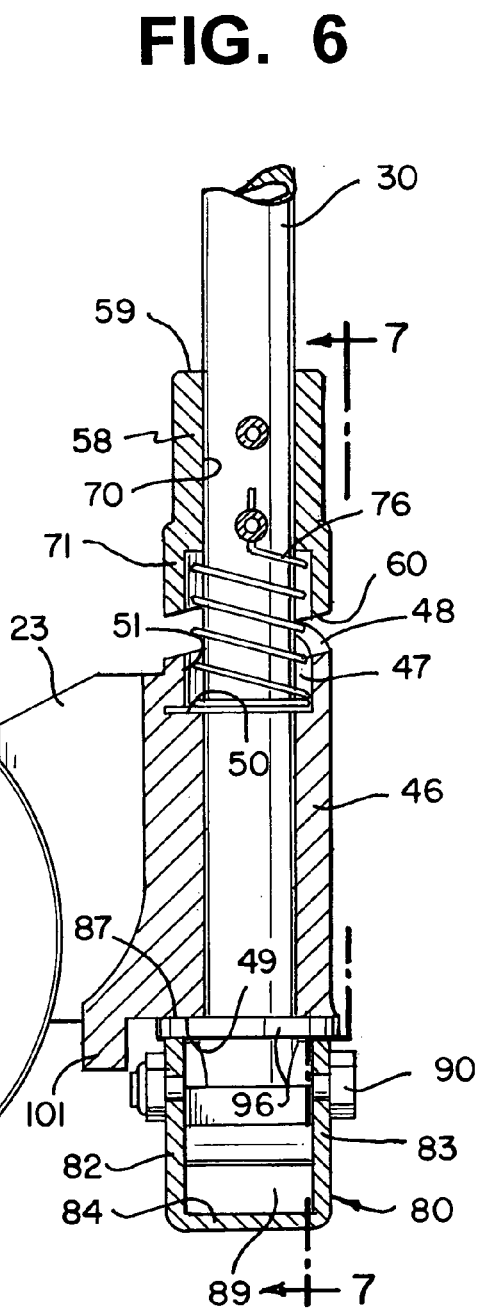

PORTABLE LUGGAGE CARTS/CARRIERS

TECHNICAL FIELD

This invention relates to luggage carts and, more particularly, to two-wheeled portable luggage carts or carriers which are completely foldable and portable.

BACKGROUND ART

In order to accommodate the diverse needs and desires of consumers, numerous luggage cart constructions have been developed over the years. In this regard, many prior art constructions presently exist which enable consumers to easily transport a plurality of suitcases on a single cart or carrier which is also easily folded or collapsed into a small, compact configuration.

As these prior art, portable, luggage carts/carriers were developed, numerous alternate designs were implemented for increasing consumer convenience. In this regard, one area which received particular attention was the construction of a luggage cart/carrier wherein the support wheels automatically arcuately pivot between a stowed position and a fully deployed, usable position. Although this type of construction quickly became popular, difficulties were often encountered with prior art constructions due to their inability to provide repeatable, reliable, controlled movement of the support wheels in a cost effective construction.

In attempting to resolve this difficulty and satisfy consumers' needs and desires, several prior art products have attempted to produce luggage cart/carriers with pivotable wheel members. However, although substantial effort has been expended in attempting to develop a reliable and dependable construction, these efforts have generally failed to fully satisfy all of the consumers needs and demands.

In particular, these prior art products are typically constructed with extremely complicated pivoting systems, requiring numerous parts and assembly difficulties. As a result, substantial expense is incurred in the manufacture of these products, as well as suffering from breakdowns and operational malfunctions.

In addition, other prior art products are constructed with activation systems which are susceptible to jamming or failure during the opening operation. In addition, some systems require sliding engagement of metal parts which are prone to incur jamming during repeated use. As a result, these prior art systems are frequently difficult to operate and have proven to be unacceptable to consumers, due to these difficulties.

Therefore, it is a principal object of the present invention to provide a portable luggage cart/carrier having a two-wheeled configuration wherein the movement of the wheels are easily, conveniently, and reliably controlled by the user.

Another object of the president invention is to provide a portable luggage cart/carrier having the characteristic features described above which is quickly and easily folded by the user in its entirety for occupying a minimum area.

Another object of the present invention is to provide a portable luggage cart/carrier having the characteristic features described above wherein movement of the luggage support member automatically causes the wheel supporting brackets to pivot between the two desired positions.

Another object of the present invention is to provide a portable luggage cart/carrier having the characteristic features described above which is constructed using a minimum number of components all of which are capable of being quickly and easily assembled.

Another object of the present invention is to provide a portable luggage cart/carrier having the characteristic features described above which is capable of being manufactured and sold at competitive prices.

Other and more specific objects will i n part be obvious and will in part appear hereinafter.

SUMMARY OF THE INVENTION

By employing the present invention, all of the difficulties and drawbacks found in the prior art constructions have been eliminated and a small, compact, two wheeled, luggage cart/carrier is achieved which is capable of quickly and easily arcuately pivoting wheel support brackets between two alternate positions, with ease and convenience. In accordance with the present invention, the arcuate pivoting movement of the wheel supporting brackets is automatically achieved simultaneously with movement of the luggage support platform from a stowed position to a deployed, usable position.

In accordance with the present invention, the luggage cart/carrier is constructed with a frame assembly, two wheel holding carriers which are arcuately pivotably mounted to the frame assembly, and a support platform which is also pivotally mounted to the frame assembly. In the preferred construction, the pivotal movement of the support platform relative to the frame assembly automatically controls the arcuate pivoting movement of the two wheel holding carriers. Furthermore, for added convenience, the frame member is constructed for being folded into a small, compact area.

In the present invention, the support platform is pivotally mounted to the terminating end of the frame assembly for being arcuately pivoted between a first, stowed position and a second, deployed position wherein the support platform is substantially perpendicular to the plane established by the frame assembly. In addition, in the preferred construction, the support platform is affixed to a pair of brackets, each of which are pivotally mounted to the opposed ends of the frame assembly and cooperate with the wheel holding carriers to cause the wheel holding carriers to arcuately pivot. In this way, the movement of the support platform from its stowed position into its deployed position simultaneously causes the wheel holding carriers to pivot about 90° from the stowed position to the useable position wherein the wheels support any items placed on the platform and enable the items and the entire cart/carrier to be easily moved.

In the preferred construction, each wheel holding carrier is pivotally mounted to the frame assembly, with the arcuate movement thereof controlled by a torsion spring or coil spring associated therewith. By mounting the spring members to the frame assembly and to a collar mounted to the frame assembly, the movement of the support platform causes the frame legs to axially move relative to the wheel holding carriers while simultaneously changing the effective length of the spring members. As a result, arcuate pivoting movement of the wheel holding carriers is achieved.

In the typical operation, both the wheel holding carriers and the support platform are maintained in a folded, stowed position, with all components aligned in substantially identical planes with the plane established by the frame assembly. However, whenever the use of the luggage cart/carrier is desired, the support platform is arcuately pivoted from its stowed position into its deployed position, wherein the support platform is placed in any plane substantially perpendicular to the frame assembly. During this arcuate movement, the two wheel holding carriers are simultaneously arcuately pivoted about the frame assembly from their stowed position to their deployed position, extending perpendicularly from the frame assembly in a direction opposite from the support platform, resulting in a fully deployed luggage cart/carrier ready for use by the consumer.

By employing this construction, an easily constructed, economical, and reliable luggage cart/carrier is a realized which provides consumers with all of the attributes desired by the consumer. In addition, a safe and dependable product is realized, which is easily deployed by the consumer into its usable configuration, while also being quickly and easily returned to a compact, stowable configuration.

The invention accordingly comprises an article of manufacture possessing the features, properties, and relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which:

FIG. 5 is a top plan view of a portion of the luggage cart/carrier of the present invention taken along the line 5—5 of FIG. 3;

FIG. 6 is a cross-sectional side elevation view, partially broken away, of a portion of the luggage cart/carrier of the present invention taken along the lines 6—6 of FIG. 5;

DETAILED DESCRIPTION

Figure 1:
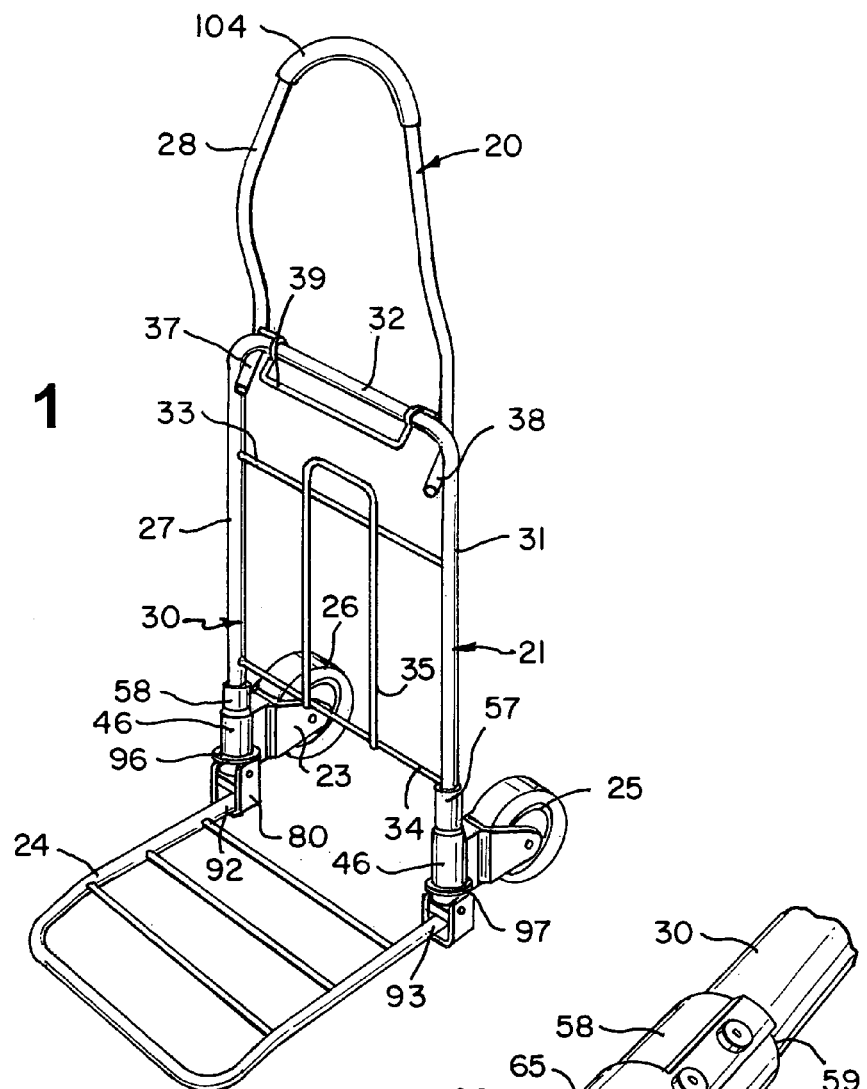
FIG. 1 is a perspective view of the luggage cart/carrier of the present invention shown and in its is fully extended, operational position.
Figure 10:
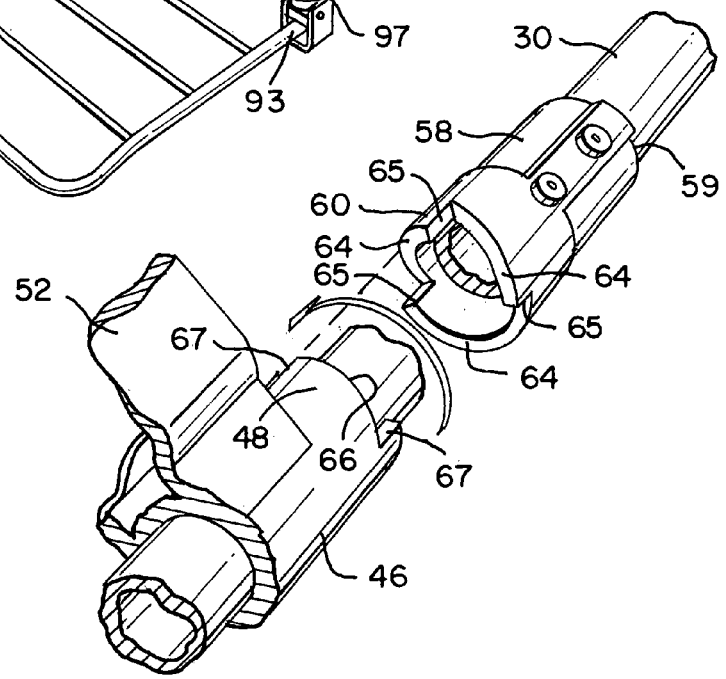
FIG. 10 is a perspective view of particular components of the luggage cart/carrier of the present invention depicting the interengagement of one wheel holding carrier with one cooperating tubular member.
Figure 2:
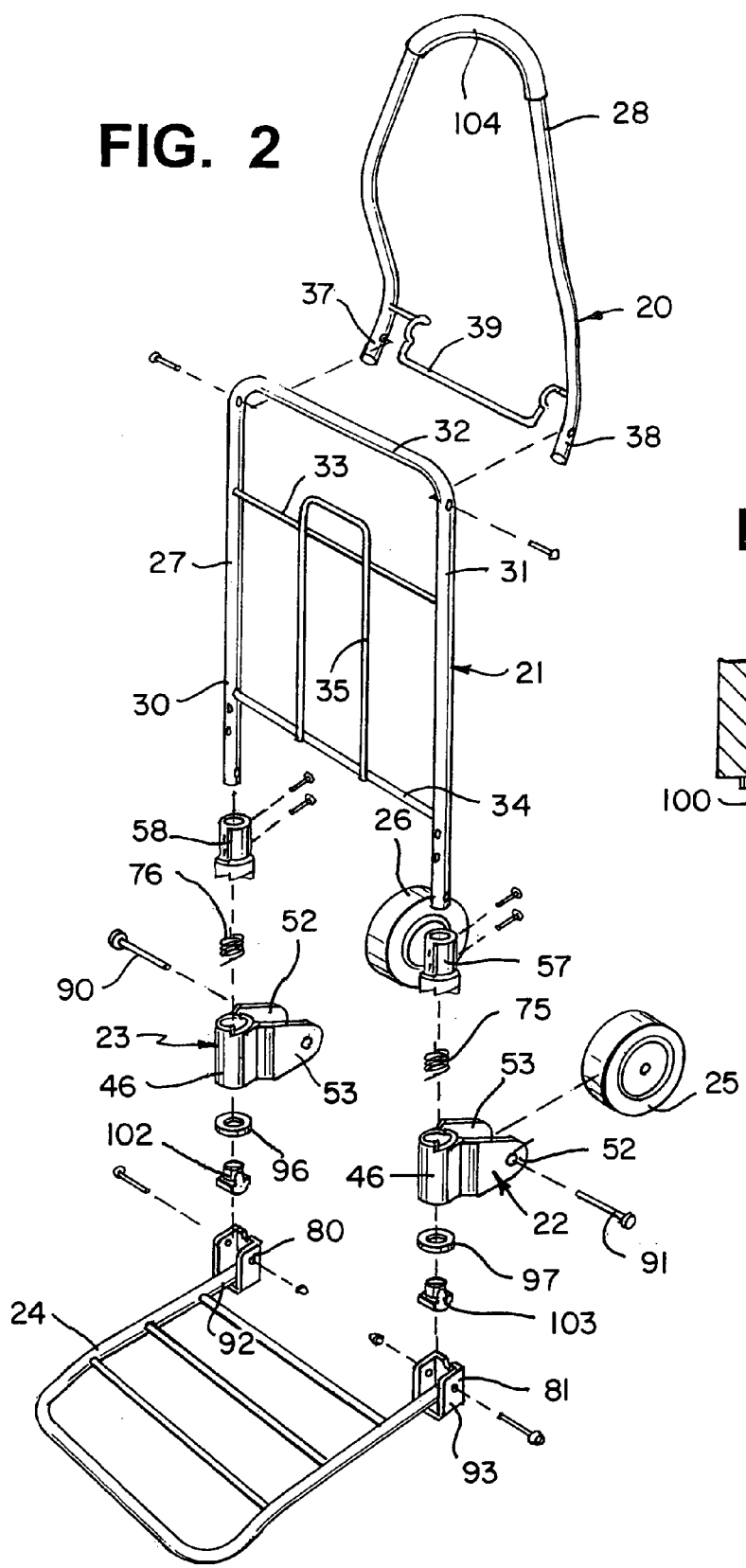
FIG. 2 is an exploded perspective view of the luggage cart/carrier of FIG. 1, depicting all of the components employed therein.
Figure 9:
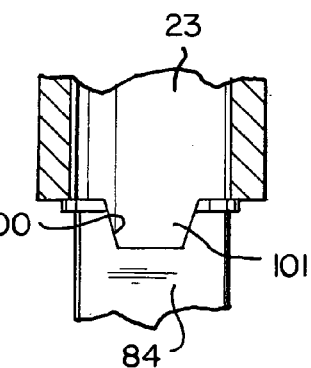
FIG. 9 is a side elevation view of a portion of the luggage cart/carrier of the present invention as taken along line 9—9 of FIG. 8.

By referring to FIGS. 1–9, along with the following detailed discussion, the construction and operation of the preferred embodiment of luggage cart/carrier 20 of the present invention can best be understood. Although this disclosure provides the best mode known to the Applicant for the present invention, alternate constructions and variations can be implemented without deviating from the scope of the present invention. Consequently, it is to be recognized that this disclosure is provided for exemplary purposes only and is not intended as a limitation of the present invention.

As the best seen in the FIGS. 1–5, luggage cart/carrier 20 principally incorporates frame assembly 21, wheel holding carriers 22 and 23, support platform 24, and wheels 25 and 26. In the preferred construction, frame assembly 21 comprises a generally U-shaped, principally tubular frame member 27 and curved, handle extension 28. As depicted, and as further detailed below, handle extension 28 is preferably mounted to the closed end of frame member 27 for arcuate, pivoting movement relative thereto, thereby enabling frame assembly 21 to be easily folded into a small, compact configuration.

In the preferred construction of luggage cart/carrier 20 of the present invention, U-shaped, tubular frame member 27 of frame assembly 21 is preferably formed from a continuous, elongated length of tubular material which is bent into a substantially U-shape configuration, defined by side legs 30 and 31 and connecting leg 32. Furthermore, frame member 27 also preferably incorporates stiffing rods 33 and 34 which are mounted to and extend between legs 30 and 31, providing added rigidity and stiffness to frame member 27. In addition, rectangular shaped wire member 35 is also preferably mounted to rods 33 and 34 for increasing the rigidity and stiffness thereof, while also eliminating large open zones in frame member 27, thereby assuring that items stacked on luggage cart/carrier 20 are incapable of sliding through frame member 27.

Although handle extension 28 may comprise any desired size and/or shape, the preferred embodiment of the present invention incorporates a generally U-shaped or open oval shaped member having terminating ends 37 and 38. Furthermore, in this preferred configuration, terminating end 37 is pivotally mounted to leg 30 of frame member 27 directly adjacent leg 32, while terminating end 38 is mounted to leg 31 of frame member 27, directly adjacent connecting leg 32. In this way, handle extension 28 is capable of arcuate pivoting movement relative to frame member 27 for effectively and easily controlling the overall length and/or height of frame assembly 21 and enabling frame assembly 21 to be easily moved between a folded configuration and a fully extended, operational configuration.

Figure 3:
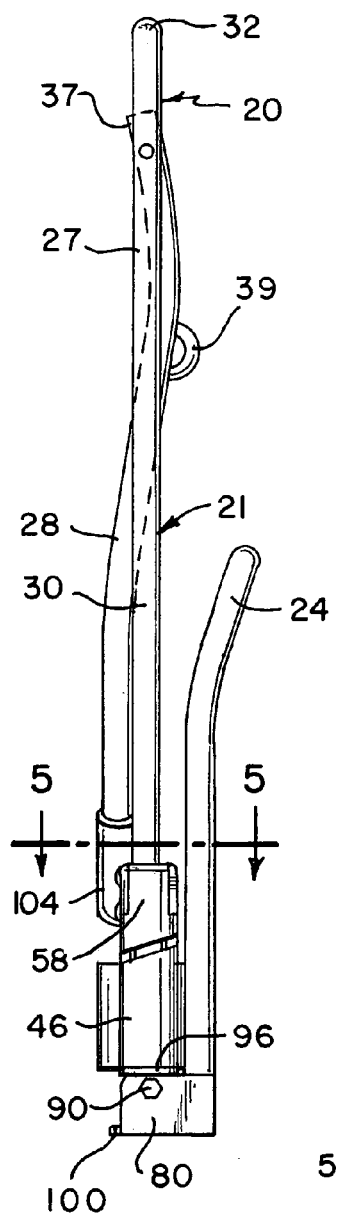
FIG. 3 is a side elevation view of the luggage cart/carrier of FIG. 1, shown in its collapsed or folded position.
Figure 4:
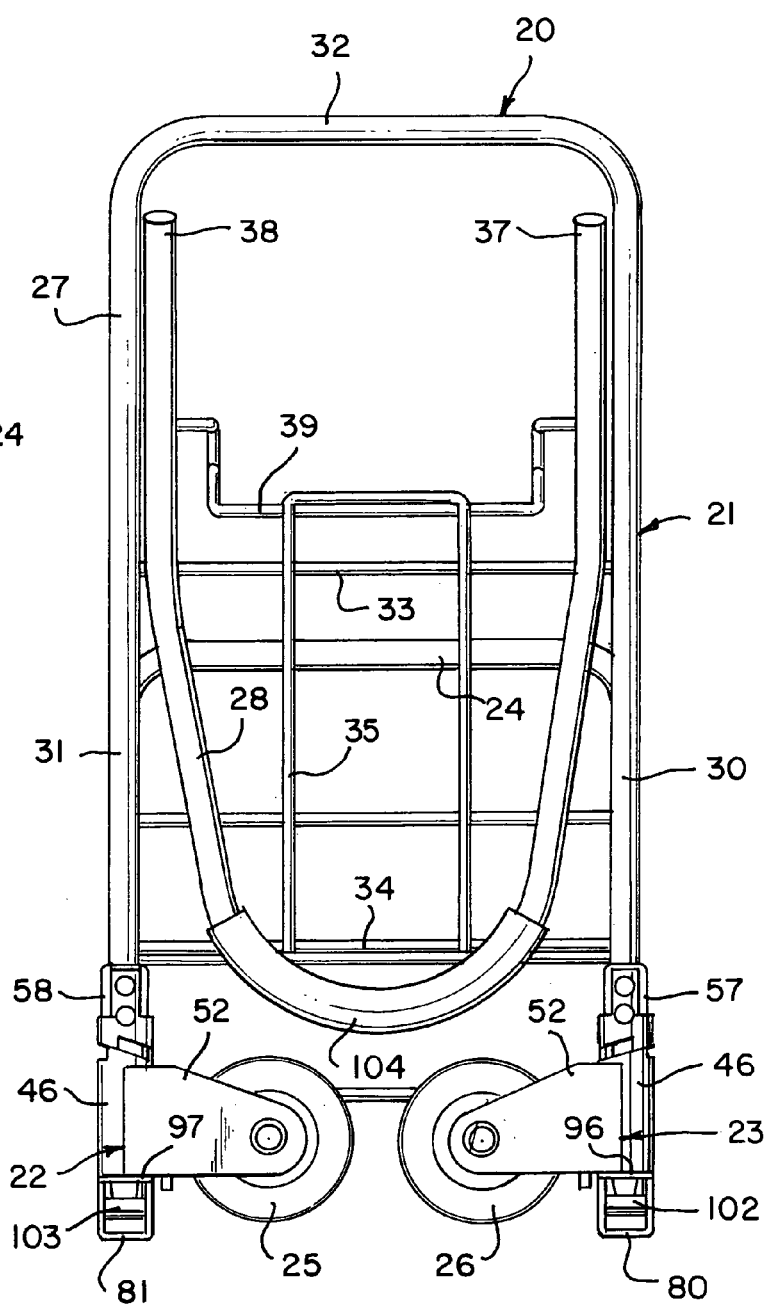
FIG. 4 is a rear elevation view of the luggage cart/carrier of FIG. 3.

In order to enable frame member 27 and handle extension 28 of frame assembly 21 to be quickly and easily moved between a collapsed or folded position, as shown in FIGS. 3 and 4, and a fully extended, operational position, as shown in FIG. 1, with handle extension 28 and frame member 27 lockingly engaged with each other, handle extension 28 preferably comprises locking bar 39 which is pivotally mounted to handle extension 28, adjacent terminating ends 37 and 38. As clearly depicted in FIG. 1, locking bar 39 is dimensioned and constructed for quickly and easily pivoting into locking engagement with leg 32 of frame member 27, securely affixing handle extension 28 in the desired upright position. In addition, whenever desired, locking bar 39 is easily disengaged from connecting leg 32, enabling handle extension 28 to be arcuately pivoted into its collapsed/folded configuration.

In order to enable luggage cart/carrier 20 of the present invention to be quickly and easily moved from a fully collapsed/folded, stowable position, depicted in FIGS. 3 and 4, into its fully deployed and operational position, depicted in FIG. 1, support platform 24 is also arcuately pivoted relative to frame member 27. As shown, support platform 24 is preferably pivoted through an arc of about 90° in order to move from the stowed positioned into the fully deployed, operational position.

In addition, as is more fully detailed below, wheel supporting carriers 22 and 23 are constructed to arcuately pivot from a stowed position to a deployed position simultaneously with the movement of support platform 24. As shown in FIGS. 3 and 4, wheel supporting carriers 22 and 23, with wheels 25 and 26 mounted thereto, are positioned in a juxtaposed, side-to-side substantially planar relationship with each other, when in their stowed positioned, for providing a fully collapsed, configuration.

In addition, as shown in FIG. 1 and further detailed below, wheel supporting carriers 22 and 23, with wheels 25 and 26, are automatically arcuately pivoted through an arc of about 90° simultaneously with the movement of support platform 24, for positioning carriers 22 and 23 and wheels 25 and 26 to extend substantially perpendicularly from frame member 27 in a rearward direction, while support platform 24 extends perpendicularly from frame member 27 in a forward direction. Once platform 24, wheel supporting carriers 22 and 23, and wheels 25 and 26 are in their respective positions, along with handle extension 28 in its raised and locked position, luggage cart/carrier 20 is ready for use.

One of the principal feature of the present invention is the construction and operation of wheel supporting carriers 22 and 23. As discussed above, wheel supporting carriers 22 and 23, with wheels 25 and 26 supportingly retained therewith, are automatically pivoted through an arc of about 90° simultaneously with the pivoting movement of support platform 24 from its folded position to its extended position. In this way, luggage cart/carrier 20 is quickly and easily activated from its stowed configuration to its fully operational and usable position.

As best seen in FIGS. 1 and 3–8, wheel supporting carriers 22 and 23 are automatically pivoted through the desired arcuate distance of 90° due to the unique construction and interaction of wheel supporting carriers 22 and 23 with frame member 27, support platform 24, and the components interconnected therewith. In this regard, the following detailed disclosure fully describes each of these preferred cooperating components and the unique, interaction and controlled arcuate pivoting movement attained thereby.

In this preferred construction, wheel supporting carrier 22 is mounted to leg 31 of frame member 27, while wheel supporting carrier 23 is mounted to leg 30 of frame member 27. In addition, wheel supporting carriers 22 and 23 are each preferably constructed from a single, fully integrated housing 46 which incorporates an elongated cylindrically shaped cavity 47 formed therein, terminating with upper end 48 and lower end 49. In addition, the internal diameter of cavity 47 is constructed to be slightly greater than the outside diameter of legs 30 and 31 of frame member 27, in order to enable housing 46 of each wheel holding bracket member 22 and 23 to freely arcuately pivot about side legs 30 and 31.

In the preferred construction of housing 46, cylindrically shaped cavity 47 is constructed within an internal ledge 50 formed therein, establishing internal wall 51 with a diameter greater than the diameter of cylindrical cavity 47. As depicted, wall 51 extends from ledge 50 to upper end 48. In this way, a spring holding zone is established along the length of internal cavity 47 in housing 46 for enabling a movement controlling, coil spring member to be mounted between wall 51 and the outer surface of legs 30 and 31 and securely retained therein.

The construction of housing 46 is completed by incorporating support panels 52 and 53, which extend from cavity 47 in juxtaposed, spaced, facing relationship to each other. By positioning panels 52 and 53 in this desired orientation, with the spacing therebetween between slightly greater than the thickness of wheels 25 and 26, the desired secure holding and mounting location for wheels 25 and 26 is realized, with wheels 25 and 26 being securely affixed and integrally interconnected with housing 46 of wheel supporting carriers 22 and 23.

In addition, luggage cart/carrier 20 also incorporates tubular members 57 and 58 which are securely affixed to frame member 27 in cooperating relationship with wheel supporting carriers 22 and 23. In the preferred construction, tubular member 57 is securely affixed to leg 31 in cooperating relationship with upper end 48 of housing 46 of wheel holding bracket member 22, while tubular member 58 is securely affixed to leg 30 of frame member 27 in cooperating relationship with upper end 48 of housing 46 of wheel holding bracket member 23.

Tubular members 57 and 58 each incorporate an upper end 59 and a lower end 60, with each lower end 60 of tubular members 57 and 58 comprising a plurality of sloping, ramped, cam surfaces 64 in combination with abutment walls 65. As shown, each sloping, ramped, cam surface 64 extends from one abutment wall 65 to an adjacent abutment wall 65, extending from an inner edge of a first abutment wall 65 to an outer edge of the adjacent abutment wall 65. Although any desired number of cam surfaces 64 and abutment walls 65 can be formed on end 60 of tubular members 57 and 58, it has been found that the incorporation of three cam surfaces 64 in combination with three abutment walls 65 is preferred.

In addition, in the preferred embodiment, upper end 48 of housing 46 incorporates a virtually identical combination of sloping, ramped, cam surfaces 66 in combination with abutment walls 67. As clearly depicted, cam surfaces 66 and abutment wall 67 of end 48 of housing 46 are constructed for cooperating, sliding, contacting engagement with cam surfaces 64 and abutment wall 65 of tubular members 57 and 58. In this way, whenever wheel supporting carriers 22 and 23 are arcuately pivoted from their folded position to their extended, operational position, cam surfaces 66 and abutment wall 67 of wheel supporting carriers 22 and 23 are arcuately pivoted into abutting contact with cooperating cam surfaces 64 and abutment wall 65 of tubular members 57 and 58.

As a result, when wheel supporting carriers 22 and 23 are positioned in their fully extended, operational orientation, abutment wall 67 of housing 46 of wheel supporting carriers 22 and 23 are fully engaged with abutment wall 65 of tubular members 57 and 58. Since tubular members 57 and 58 are affixed to frame member 27, assurance is provided that carriers 22 and 23 are capable of only pivoting through the precisely desired arcuate distance, with any additional arcuate movement being prevented.

In the preferred embodiment, tubular members 57 and 58 are each constructed with a generally cylindrically shaped body incorporating a cylindrically shaped, internal cavity or passageway 70 extending between ends 59 and 60. Preferably, cavity/passageway 70 incorporates an internal diameter slightly greater than the outer diameter of legs 30 and 31 of frame member 27. In this way, tubular members 57 and 58 are easily advanced onto legs 30 and 31, and then securely affixed thereto in the desired position.

In addition, tubular members 57 and 58 preferably incorporate an integral collar 71 formed about the base of tubular members 57 and 58, directly adjacent end 60. In the preferred construction, collar 70 incorporates an inner wall 72 which comprises a diameter greater than the diameter of passageway/cavity 70, as well as the outer diameter of legs 30 and 31. In this way, as detailed below, a movement controlling, coil spring member receiving and retaining zone is formed in tubular members 57 and 58 for cooperating with movement controlling, coil spring members to be positioned therein and affixed to tubular members 57 and 58.

In order to provide the desired controlled, arcuate, pivoting movement of wheel supporting carriers 22 and 23 relative to frame member 27, luggage cart/carrier 20 incorporates movement controlling, coil spring members 75 and 76. Coil spring member 75 is affixed at one end thereof to wall 51 of housing 46 of bracket members 22, directly adjacent ledge 50. In addition, the opposed end of coil spring member 75 is affixed to inner wall 72 of collar 71 of tubular member 57. Similarly, one end of movement controlling, coil spring member 76 is affixed to wall 51 of housing 46 of bracket member 23, directly adjacent ledge 50. In addition, the opposed end of coil spring member 76 is affixed to inner wall 72 of collar 71 of tubular member 58.

Furthermore, movement controlling, coil spring members 75 and 76 are securely mounted in the manner detailed above with each coil spring member being in compression as well as under tension in an arcuate direction. As a result of this construction, coil spring members 75 and 76 exert a force which continuously urges wheel supporting carriers 22 and 23 away from tubular members 57 and 58. In addition, the arcuate tension imposed upon coil spring members 75 and 76 controllably forces carriers 22 and 23 to arcuately pivot whenever wheel supporting carriers 22 and 23 are axially moved along legs 30 and 31, altering the effective length of spring members 75 and 76.

As further detailed below, the arcuate pivoting movement of support platform 24 from its folded position to its extended position forces wheel supporting carriers 22 and 23 to be axially advanced upwardly towards tubular members 57 and 58. This axial movement causes coil spring members 75 and 76 to be further compressed, while simultaneously causing the arcuate tension force imposed upon coil spring members 75 and 76 to increase. As a result, spring members 75 and 76 cause carriers 22 and 23 to arcuately pivot, moving carriers 22 and 23 from their folded position to their extended position. In this way, the desired arcuate pivoting movement of carriers 22 and 23 is automatically achieved simultaneously with the arcuate movement of support platform 24 from its folded position to its extended position.

In order to achieve the desired, controlled, arcuate pivoting movement of carriers 22 and 23 relative to frame member 27, movement controlling brackets 80 and 81 are mounted to U-shaped tubular frame member 27. In the preferred construction, movement controlling bracket 80 is mounted to the terminating end of leg 30 of frame member 27 for pivotal movement relative thereto, while movement controlling bracket 81 is pivotally mounted to the terminating end of leg 31 of frame member 27. Preferably, bracket 80 is mounted to leg 30 by bolt means 90, which establishes the pivot axis for bracket 80, while bracket 81 is mounted to leg 31 by bolt means 91 which defines the pivot axis for bracket 81.

In order to control the pivoting movement of brackets 80 and 81 relative to legs 30 and 31 of frame member 27 about their respective pivot axes, terminating end 92 of support platform 24 is securely affixed to movement control bracket 80, while terminating end 93 of support platform 24 is securely affixed to movement control bracket 81. By employing this construction, the arcuate movement of support platform 24 from its stowed position to its extended position automatically causes bracket 80 and 81 to arcuately pivoted therewith relative to frame member 27.

In the preferred construction, brackets 80 and 81 each comprise a generally U-shaped, elongated channel defined by sidewalls 82 and 83 and connecting wall 84. In addition, walls 82, 83, and 84 of bracket 80 and 81 incorporate front edge 85, rear edge 86, and top edge 87. Furthermore, front edge 85 and top edge 87 of sidewalls 82 and 83 are joined by rounded corner 88. Finally, brackets 80 and 81 each incorporate an endwall 89 which is mounted to rear edge 86 of sidewalls 82, 83 and connecting wall 84.

In the preferred construction, terminating ends 92 and 93 of platform 24, and the surrounding area thereof, are securely affixed to movement control bracket 80 and 81 by welding, or other suitable secure fastening means. In this way, the secure, fully integrated, integral affixation of support platform 24 to movement control brackets 80 and 81 is assured, along with the desired arcuate pivoting movement of brackets 80 and 81 relative to side legs 30 and 31 of frame member 27, in response to the movement of platform 24.

In addition, in order to provide the desired controlled axial movement of wheel holding carriers 22 and 23 along legs 30 and 31 of frame assembly 27, in response to the arcuate pivoting movement of support platform 24 and integrated movement control brackets 80 and 81, washer 96 is movably mounted to leg 30 of frame member 27, directly between lower end 49 of housing 46 of wheel holding carriers 22 and movement control bracket 80. Similarly, washer 97 is movably mounted to leg 31 of frame member 27, directly between lower end 49 of housing 46 of wheel holding carrier 23 and movement control bracket 81.

Figure 8:
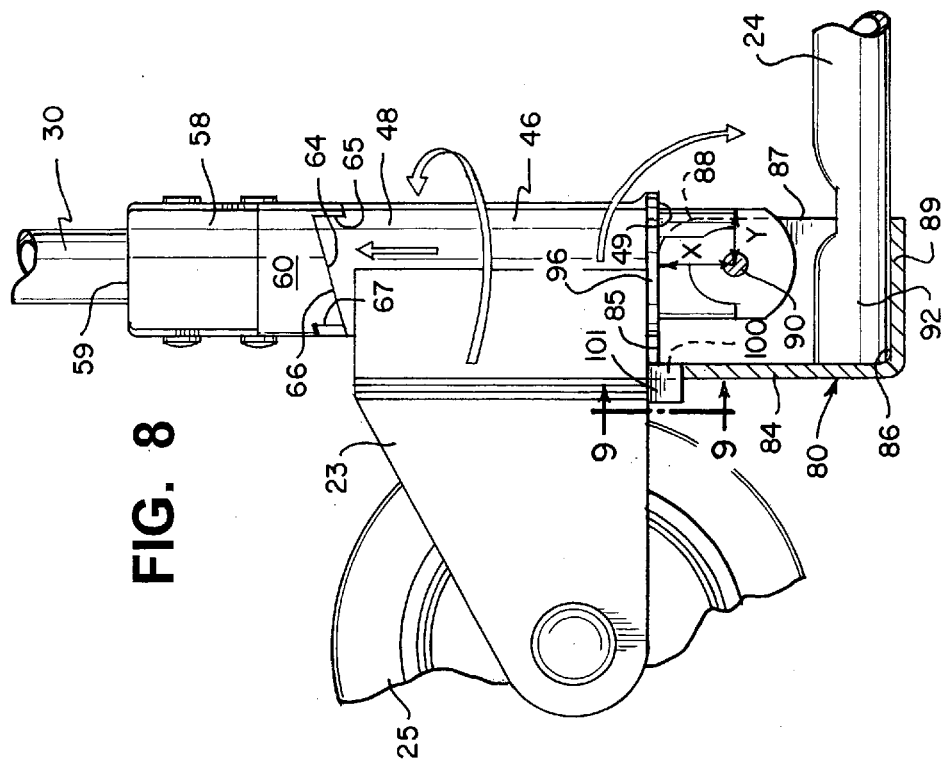
FIG. 8 is a side elevation view, partially in cross-section and partially broken away, depicting a portion of the luggage cart/carrier of the present invention similar to FIG. 7, with the wheel holding carrier in its operational position.
Figure 7:
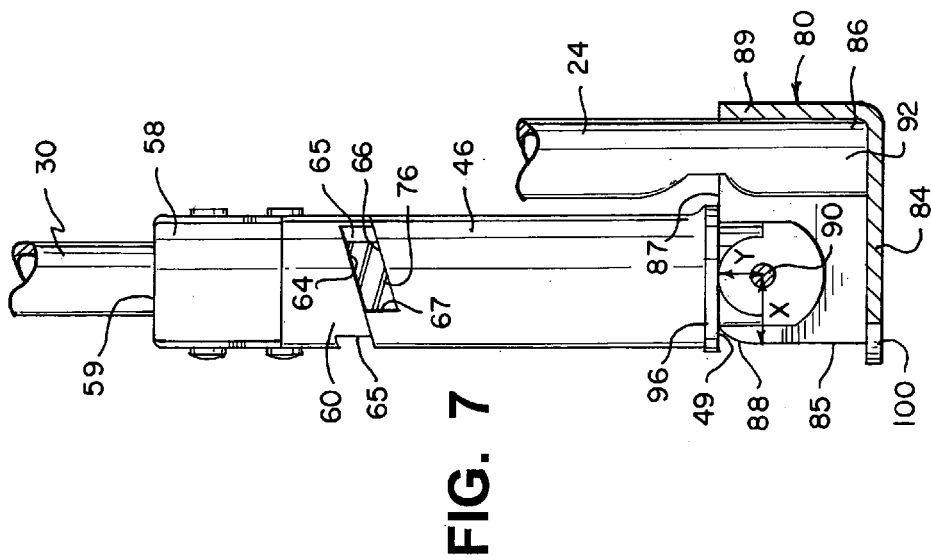
FIG. 7 is a side elevation view, partially in cross-section and partially broken away, depicting a portion of the luggage cart/carrier of the present invention as taken along line 7—7 of FIG. 6, with the wheel holding carrier in its folded position.

As best in FIGS. 6–8, movement control brackets 80 and 81 are mounted to legs 30 and 31 of frame member 27 for controlled arcuate pivoting movement about the axis defined by bolt means 90 and 91. In addition, the apertures formed in sidewalls 82 and 83 of movement control brackets 80 and 81, through which bolt means 90 and 91 longitudinally extend, are positioned for being in cooperating relationship with front edge 85, top edge 87, and rounded corner 88 of movement control brackets 80 and 81.

Furthermore, the apertures formed in sidewalls 82 and 83 are specifically positioned for being spaced away from front edge 85 distance "X" which is greater than the spaced distance "Y" between the apertures and top edges 87. In the preferred construction, the spaced distance "X" between the apertures and front edges 85 of sidewalls 82 and 83 is twice the spaced distance "Y" between the apertures and top edges 87 of sidewalls 82 and 83.

As a result of this construction, and the construction detailed above in regard to the mounted assembly of wheel holding carriers 22 and 23 and tubular members 57 and 58, wheel holding carriers 22 and 23 are mounted in their folded configuration with washers 96 and 97 sandwiched between lower end 49 of housing 46 of wheel holding carriers 22 and 23 and top edges 87 of sidewalls 82 and 83 of movement control brackets 80 and 81. In addition, since wheel holding carriers 22 and 23 are maintained in contact with coil spring members 75 and 76, and coil spring members 75 and 76 are maintained under compression, wheel holding carriers 22 and 23 are continuously urged downwardly, maintaining contact with washers 96 and 97, as well as top edges 87 of side-walls 82 and 83 of movement control brackets 80 and 81.

In addition, whenever support platform 24 is arcuately pivoted from its folded position to its operational position, movement control brackets 80 and 81 are arcuately pivoted about the axis defined by bolt means 90 and 91. As best seen in FIGS. 7 and 8, this arcuate pivoting movement causes rounded corner 88 of movement control brackets 80 and 81 when to sliding contact washers 96 and 97, forcing washers 96 and 97 and wheel holding carriers 22 and 23 upwardly, while simultaneously axially 80 moving legs 30 and 31 of frame member 27 downwardly until front edge 85 of sidewalls 82 and 83 are in contact with washer is 96 and 97.

As detailed above, since the apertures formed in sidewalls 82 and 83 of movement control brackets 80 and 81, which establish the pivot axis for brackets 80 and 81, are spaced away from front edges 85 a greater distance then top edges 87, the movement of brackets 80 and 81 with support platform 24 from the folded position to the extended, operational position causes wheel holding carriers 22 and 23 to move upwardly while legs 30 and 31 of frame assembly 27 are drawn downwardly. As a result of this movement, wheel holding carriers 22 and 23 are forced to arcuately pivot, in the desired manner, due to the forces imposed by coil spring members 75 and 76 by the axial movement of carriers 22 and 23. As a result, the desired, controlled, arcuate pivoting movement of carriers 22 and 23 is realized.

In order to assure that wheel holding carriers 22 and 23 are securely maintained in their arcuately pivoted, operational position, connecting walls 84 of brackets 80 and 81 incorporate an enlarged recess or cavity 100 formed therein, preferably comprising a generally trapazoidal shape. In addition, carriers 22 and 23 each incorporate a similarly shaped extension tab 101 formed on the lower surface thereof and positioned for cooperating, mating, locking interengagement with recess 100.

In this way, when carriers 22 and 23 have been arcuately pivoted into their operational position, any further, pivoting movement in either direction is prevented, due to the locked interengagement of tabs 101 and recesses 100. As a result, assurance is provided that wheel holding carriers 22 and 23 are maintained in their operational position, free from unwanted wobbling or side to side movement.

In completing the preferred construction of luggage cart/carrier 20 of the present invention, end caps 102 and 103 are mounted to the terminating ends of legs 30 and 31 of frame member 28, with end caps 102 and 103 incorporating rounded terminating surfaces. By employing end caps 102 and 103 constructed in this manner and preferably formed from plastic, assurances provided that any sliding contact between support platform 24 and legs 30 and 31 of frame member 27 is free of any unwanted frictional engagement which could possibly cause binding or damage.

Finally, in order to provide a soft, comfortable gripping zone, handle extension 28 preferably comprises a foam sleeve 104 formed along a portion of the length thereof. As depicted, foam sleeve 104 is positioned in the area where individuals will grip or hold handle extension 28 for employing luggage cart/carrier 20 of the present invention. In this way, added convenience and comfort is provided.

It will thus be seen that the objects set forth above, among those made apparent from the preceding description, are efficiently attained and, since certain changes may be made to the above article, without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A luggage cart/carrier movable between a first, compact configuration and a second, operational configuration, said cart/carrier comprising:
    A. a frame member comprising two leg portions formed in juxtaposed, spaced, parallel relationship to each other;
    B. an extension portion mounted to the frame member and movable between a first compact, stowable position and a second, fully extended, operational position;
    C. a support platform pivotally mounted to the leg portions of the frame member and movable between a first, folded position and a second, operational, luggage supporting position, and comprising two end members each being fixedly mounted to a bracket member, said bracket member being pivotally affixed to the terminating end of one of said leg portions of the frame member;
    D. two separate and independent wheel holding carriers, each being mounted to one of said leg portions for controlled, arcuate pivoting movement relative thereto, for moving said carriers between a first folded position, and a second operational position, wherein said wheel holding carriers extend rearwardly, substantially perpendicularly to the plane formed by the frame member, and each comprising a housing, said housing
        a) being constructed for supportingly maintaining a wheel member for rotational movement therein, and
        b) incorporating a longitudinally extending, cylindrically shaped cavity formed therein, dimensioned for peripherally surrounding one leg of said frame member, in cooperating pivoting relationship therewith, and
        c) having an upper edge adjacent said elongated cavity which comprises a plurality of sloping surfaces, with each sloping surface terminating with an abutment wall,
    E. a pair of movement control assemblies, each associated with one of said wheel holding carriers, with each movement control assembly being
        a) mounted to one of the leg portions of the frame member,
        b) controllably connected to one wheel holding carrier,
        c) responsive to the pivoting movement of the support platform between its first position and its second position for providing an arcuate pivoting force to the wheel holding carrier for causing said carrier to arcuately pivot in response thereto, and
        d) comprising a collar member fixedly mounted to one of said leg portions of the frame member, and an arcuate force generating member cooperatively associated with said collar member and extending therefrom into controlled engagement with said wheel supporting carrier, and each of said collar members incorporating a lower edge comprising a plurality of sloping surfaces, with each of said sloping surfaces terminating with an abutment wall, with said sloping surfaces and abutment walls being constructed for cooperating, sliding engagement with the sloping surfaces and abutment walls of the wheel holding carriers, whereby arcuate pivoting movement of the wheel holding carriers relative to the collar members is controlled and limited by the sliding engagement of the cooperating sloping surfaces in combination with contact between said cooperating abutment walls;

whereby a luggage cart/carrier is achieved which is capable of being placed in a small, compact configuration for storage, while also being quickly and easily moved into an operational position, with the wheel supporting carriers automatically arcuately pivoted into an operational, usable position, simultaneously with the movement of the support platform into its operational position.

2. The luggage cart/carrier defined in claim 1, wherein said arcuate force generating member is further defined as comprising a coil spring mounted on the outer surface of said leg portion, fixedly mounted at one end to said collar member and fixedly mounted at its opposed end to said wheel supporting carrier, with said coil spring further defined as being maintained both in compression and under arcuate tension, thereby providing the arcuate pivoting force to the carrier member in response to axial movement of said coil spring.

3. The luggage cart/carrier defined in claim 2, wherein each of said bracket members is further defined as being pivotally mounted to the leg portion of the frame member with a portion of each bracket member being maintained in movement controlling engagement with a bottom surface of the housing of one of said wheel holding carriers, whereby the arcuate pivoting movement of said bracket member relative to the leg portion causes the wheel holding carrier to axially move along the length of the leg portion.

4. The luggage cart/carrier defined in claim 3, wherein said bracket members are further defined as being positioned on the leg portions of the frame member for arcuate pivoting movement relative thereto in a manner which causes the wheel holding carriers to be axially advanced upwardly in response to movement of the support platform from its first position to its second position.

5. The luggage cart/carrier defined in claim 3, wherein each of said bracket members is further defined as comprising a locking notch formed therein and each of said wheel holding carriers is further defined as comprising a locking tab extending from the bottom surface thereof, whereby arcuate pivoting movement of the wheel holding carriers into their operational position simultaneously causes the locking tab to enter the locking notch of the bracket members for securely affixing and maintaining the wheel holding carriers in the desired position.

6. The luggage cart/carrier defined in claim 1, wherein said frame member is further defined as comprising a single, substantially continuous, tubular member formed in a generally U-shape, defining said two leg portions and an interconnecting portion extending between said leg portions.

7. The luggage cart/carrier defined in claim 6, wherein said extension portion is further defined as being formed from a single, substantially continuous, tubular member formed in a generally oval shape and incorporating two terminating ends, each of which are pivotally mounted to the frame member.

8. The luggage cart/carrier defined in claim 7, wherein said extension portion further comprises a pivotal locking bar cooperatively associated therewith and positioned for cooperating engagement with the connecting portion of the frame member, enabling the extension portion to be quickly and easily lockingly engaged with the frame member when said extension portion is in its second position.

9. The luggage cart/carrier defined in claim 8, wherein said extension portion is further defined as being pivotally mounted to the interior surface of the frame member for enabling said extension portion to be folded into a compact position cooperatively associated therewith.

10. A luggage cart/carrier movable between a first, compact configuration and a second, operational configuration, said cart/carrier comprising:
A. a frame member comprising a single, substantially continuous, tubular member formed in a generally U-shape, defining two leg portions formed and an interconnecting portion extending between said leg portions;
B. an extension portion mounted to the frame member and movable between a first compact, stowable position and a second, fully extended, operational position said extension portion being defined as being formed from a single, substantially continuous, tubular member formed in a generally oval shape and incorporating two terminating ends, each of which are pivotally mounted to the frame member.;
C. a support platform pivotally mounted to the leg portions of the frame member, movable between a first, folded position and a second, operational, luggage supporting position, and comprising two end members each being fixedly mounted to a bracket member, said bracket member being pivotally affixed to the terminating end of one of said leg portions of the frame member;
D. two separate and independent wheel holding carriers, each being mounted to one of said leg portions for controlled, arcuate pivoting movement relative thereto, for moving said carriers between a first folded position, and a second operational position, wherein said wheel holding carriers extend rearwardly, substantially perpendicularly to the plane formed by the frame member, and each comprising a housing, said housing
  a) being constructed for supportingly maintaining a wheel member for rotational movement therein, and
  b) incorporating a longitudinally extending, cylindrically shaped cavity formed therein, dimensioned for peripherally surrounding one leg of said frame member, in cooperating pivoting relationship therewith; and
  c) having an upper edge adjacent said elongated cavity which comprises a plurality of sloping surfaces, with each sloping surface terminating with an abutment wall,
E. a pair of movement control assemblies, each associated with one of said wheel holding carriers, with each movement control assembly being
  a) mounted to one of the leg portions of the frame member,
  b) controllably connected to one wheel holding carrier,
  c) responsive to the pivoting movement of the support platform between its first position and its second position for providing an arcuate pivoting force to the wheel holding carrier for causing said carrier to arcuately pivot in response thereto, and
  d) comprising a collar member fixedly mounted to one of said leg portions of the frame member, and an arcuate force generating member cooperatively associated with said collar member and extending therefrom into controlled engagement with said wheel supporting carrier, and each of said collar members incorporating a lower edge comprising a plurality of sloping surfaces, with each of said sloping surfaces terminating with an abutment wall, with said sloping surfaces and abutment walls being constructed for cooperating, sliding engagement with the sloping surfaces and abutment walls of the wheel holding carriers, whereby arcuate pivoting movement of the wheel holding carriers relative to the collar members is controlled and limited by the sliding engagement of the cooperating sloping surfaces in combination with contact between said cooperating abutment walls;

whereby a luggage cart/carrier is achieved which is capable of being placed in a small, compact configuration for storage, while also being quickly and easily moved into an operational position, with the wheel supporting carriers automatically arcuately pivoted into an operational, usable position, simultaneously with the movement of the support platform into its operational position.

11. The luggage cart/carrier defined in claim 10, wherein said arcuate force generating member is further defined as comprising a coil spring mounted on the outer surface of said leg portion, fixedly mounted at one end to said collar member and fixedly mounted at its opposed end to said wheel supporting carrier, with said coil spring further defined as being maintained both in compression and under arcuate tension, thereby providing the arcuate pivoting force to the carrier member in response to axial movement of said coil spring.

12. The luggage cart/carrier defined in claim 11, wherein each of said bracket members is further defined as being pivotally mounted to the leg portion of the frame member with a portion of each bracket member being maintained in movement controlling engagement with a bottom surface of the housing of one of said wheel holding carriers, whereby the arcuate pivoting movement of said bracket member relative to the leg portion causes the wheel holding carrier to axially move along the length of the leg portion.

13. The luggage cart/carrier defined in claim 12, wherein said bracket members are further defined as being positioned on the leg portions of the frame member for arcuate pivoting movement relative thereto in a manner which causes the wheel holding carriers to be axially advanced upwardly in response to movement of the support platform from its first position to its second position.

14. The luggage cart/carrier defined in claim 12, wherein an upper edge of each of said wheel holding carriers adjacent said elongated cavity is further defined as comprising a plurality of sloping surfaces, with each sloping surface terminating with an abutment wall, and each of said collar members incorporates a lower edge comprising a plurality of sloping surfaces, with each of said sloping surfaces terminating with an abutment wall, with said sloping surfaces and abutment walls being constructed for cooperating, sliding engagement with the sloping surfaces and abutment walls of the wheel holding carriers, whereby arcuate pivoting movement of the wheel holding carriers relative to the collar members is controlled and limited by the sliding engagement of the cooperating sloping surfaces in combination with contact between said cooperating abutment walls.

15. The luggage cart/carrier defined in claim 12, wherein each of said bracket members is further defined as comprising a locking notch formed therein and each of said wheel holding carriers is further defined as comprising a locking tab extending from the bottom surface thereof, whereby arcuate pivoting movement of the wheel holding carriers into their operational position simultaneously causes the locking tab to enter the locking notch of the bracket members for securely affixing and maintaining the wheel holding carriers in the desired position.

16. The luggage cart/carrier defined in claim 10, wherein said extension portion further comprises a pivotal locking bar cooperatively associated therewith and positioned for cooperating engagement with the connecting portion of the frame member, enabling the extension portion to be quickly and easily lockingly engaged with the frame member when said extension portion is in its second position.

* * * * *